USOO5163691A

United States Patent [19]
Lederman

[11] Patent Number: 5,163,691
[45] Date of Patent: Nov. 17, 1992

[54] STACKED SEAL WITH IMPROVED MANUFACTURE

[75] Inventor: Frederick E. Lederman, Sandusky, Ohio

[73] Assignee: General Motors Corporation, Detroit, Mich.

[21] Appl. No.: 767,754

[22] Filed: Sep. 30, 1991

[51] Int. Cl.⁵ .............................................. F16J 15/32
[52] U.S. Cl. ........................................ 277/9; 277/35; 277/152; 384/486
[58] Field of Search ................. 277/9, 35, 44, 50, 152; 384/484, 486; 220/259

[56] References Cited

U.S. PATENT DOCUMENTS

| | | |
|---|---|---|
| 2,476,324 | 7/1949 | Reich .................................. 277/152 |
| 2,979,345 | 4/1961 | Potter . | |
| 3,275,331 | 9/1966 | Mastrobattista et al. ....... 277/152 X |
| 4,042,248 | 8/1977 | Williamitis . | |
| 4,116,451 | 9/1978 | Nixon et al. . | |
| 4,155,558 | 5/1979 | Nakamura . | |
| 4,526,485 | 7/1985 | Frase et al. ......................... 384/486 |
| 4,813,691 | 3/1989 | Schenborn ..................... 277/235 B |

FOREIGN PATENT DOCUMENTS 1162645 2/1964 Fed. Rep. of Germany ...... 384/484

Primary Examiner—William A. Cuchlinski, Jr.
Assistant Examiner—Scott W. Cummings
Attorney, Agent, or Firm—Patrick M. Griffin

[57] ABSTRACT

A stacked seal is built up from an integral unit that consists of annular rings molded together in a coplanar, non overlapping series by plurality of alternately facing live hinges. The hinges are wide enough to establish a straight folding axis between adjacent pairs of rings so that they can be serially folded, one concentrically on the other, and the proper length to assure that the rings fold flat. Integral latch means self retain the rings in a stack so as to be easily installed.

3 Claims, 6 Drawing Sheets

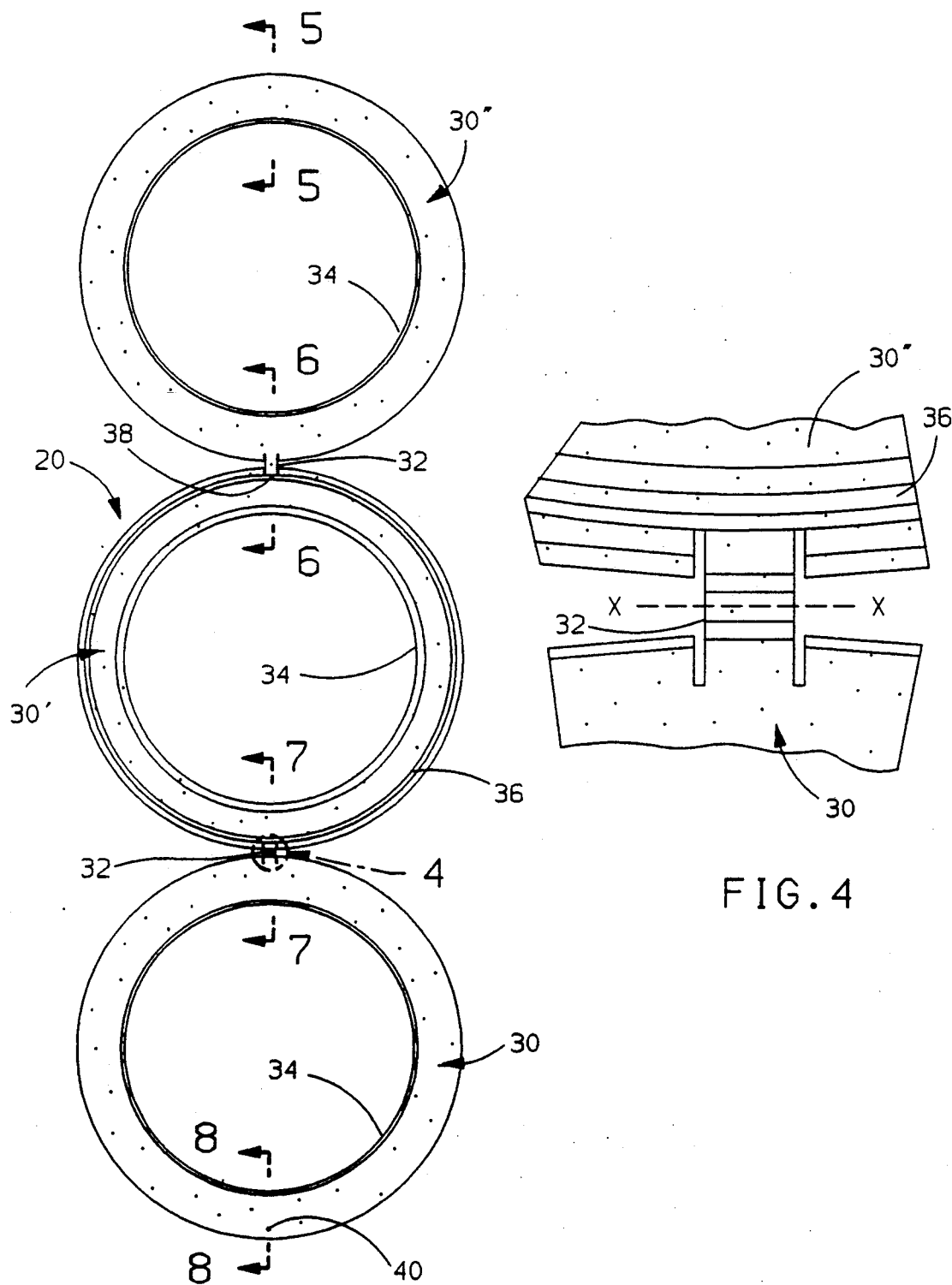
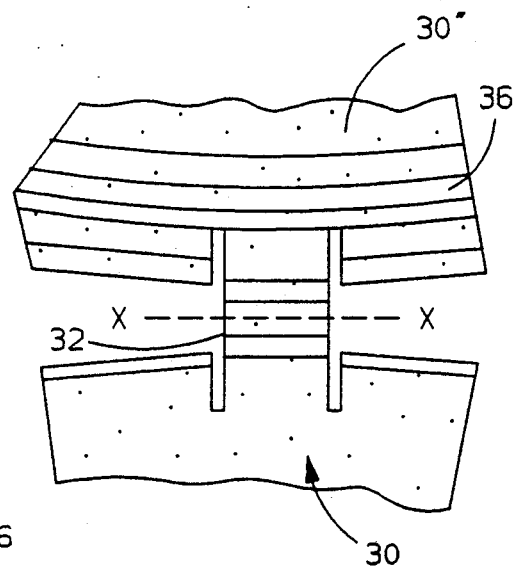
FIG.4
FIG.3

STACKED SEAL WITH IMPROVED MANUFACTURE

This invention relates to bearing seals in general, and specifically to a seal of the type that consists of a stack of separate rings.

BACKGROUND OF THE INVENTION

Seals used in bearings generally consist of a single structural element, typically an annular ring or disk that is fixed to one race with a sealing lip that rides on the other race. When a higher level of sealing integrity is desired, a seal with more than one sealing lip is necessary. One alternative is to mold a single seal with two or more lips. This complicates the molding process, because the multiple lips radially overlap one another, creating concavities or undercuts. Such a seal cannot be simply or easily molded because, as the molds part, the seal lips will have to be pulled forcefully past that part of the mold that forms the concavities between the lips.

Consequently, multiple seal lips are sometimes provided by stacking together a number of separate disks. Each disk in the stack provides one seal lip, and can be easily molded by itself. The drawback of a stacked seal, compared to a unitary multiple lip seal, is that each disk has to be handled separately at installation and oriented so that all the lips face the right way. Sometimes, the stack of disks or layers is crimped together in the proper orientation prior to installation by a separate casing, but that represents an additional component and manufacturing step.

SUMMARY OF THE INVENTION

The invention provides a stacked seal that is built up from a single, easy to mold unit. As the seal is built up, the various sealing rings automatically orient and retain themselves together.

In the embodiment disclosed, the unit consists of a series of three coplanar annular rings molded together along a straight line. Each disk is joined to an adjacent disk at a live hinge, and the three rings alternate in mirrored fashion about the hinges, lip side up, lip side down, lip side up. Because each of the rings has only one lip, the entire unit has no concavities or undercuts, and can be simply molded. The seal is built up by serially folding the rings one onto the other. The hinges fold easily in only one direction, assuring that the rings are not folded incorrectly. In addition, an integrally molded latch means engages as the rings are folded together, so there is no need for a separate clamp or casing. The completed seal can then be installed in the same way that a conventional multiple lip seal would be installed.

It is, therefore, an object of the invention to provide a stacked seal in which the separate rings do not have to be handled individually when the seal is built up and installed.

It is another object of the invention to provide such a unit in which the rings in the stack are molded together in such a way that the stack can be built up by folding the rings one onto the other.

It is another object of the invention to provide such a unit in which the rings self orient and self retain as they are folded together.

It is still another object of the invention to provide a method for manufacturing and building up such a seal.

DESCRIPTION OF THE PREFERRED EMBODIMENT

These and other objects and features of the invention will appear from the following written description, and from the drawings, in which:

FIG. 3 is a plan view of the unit from which the seal is folded;

FIG. 4 is an enlargement of the circled and numbered portion of FIG. 3;

Figure 1:
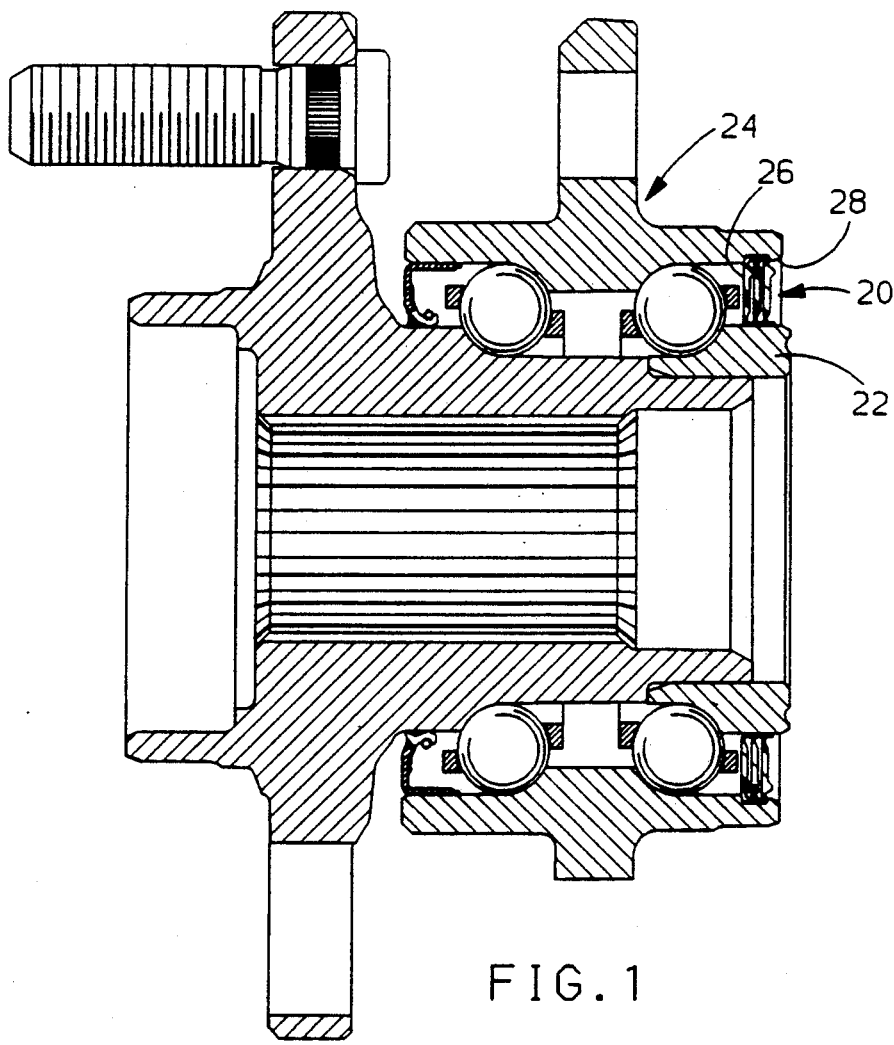
FIG. 1 is a cross section of a vehicle wheel bearing incorporating an embodiment of a seal made according to the invention.
Figure 2:
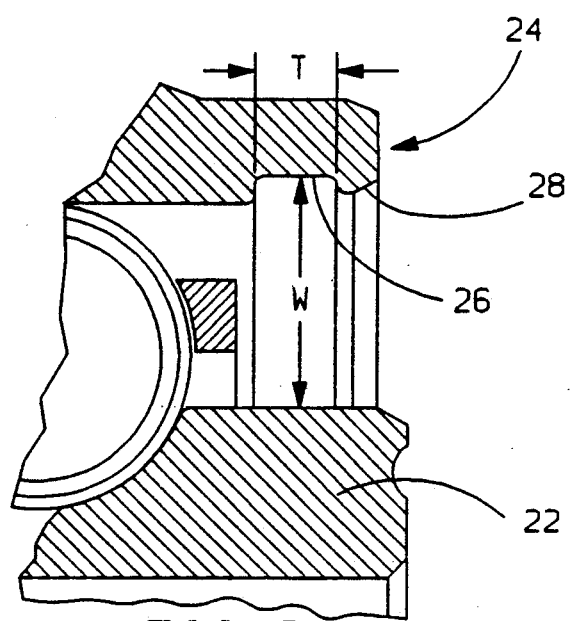
FIG. 2 is an enlargement of just the portion of the bearing to which the seal is installed.
Figure 5:
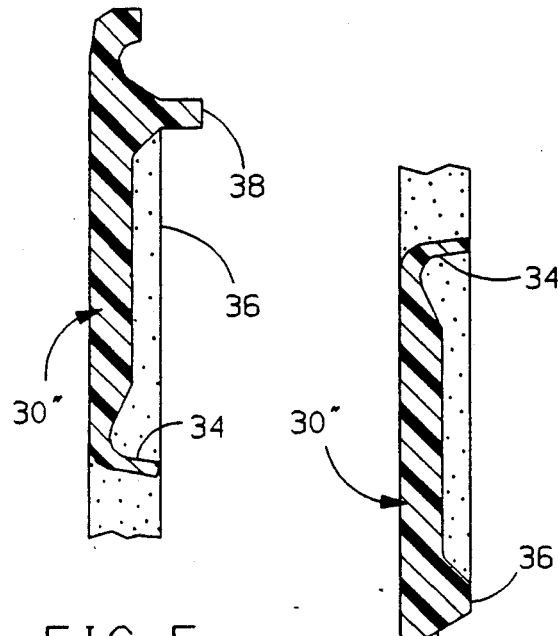
FIG. 5 is a cross section taken along the line 5—5 of FIG. 3.
Figure 6:
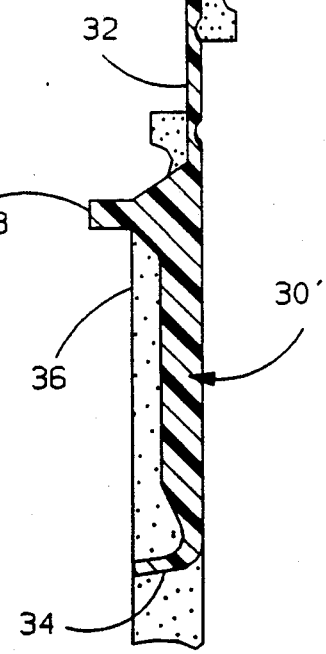
FIG. 6 is a cross section taken along the line 6—6 of FIG. 3.
Figure 7:
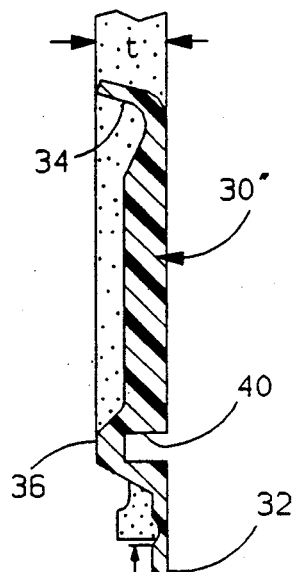
FIG. 7 is a cross section taken along the line 7—7 of FIG. 3.
Figure 8:
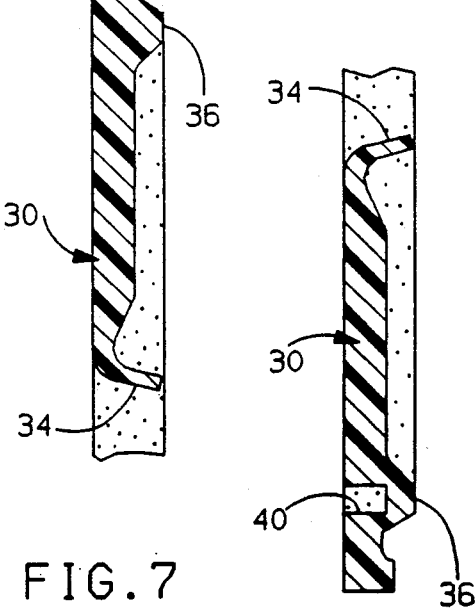
FIG. 8 is a cross section taken along the line 8—8 of FIG. 3.
Figures 9, 10:
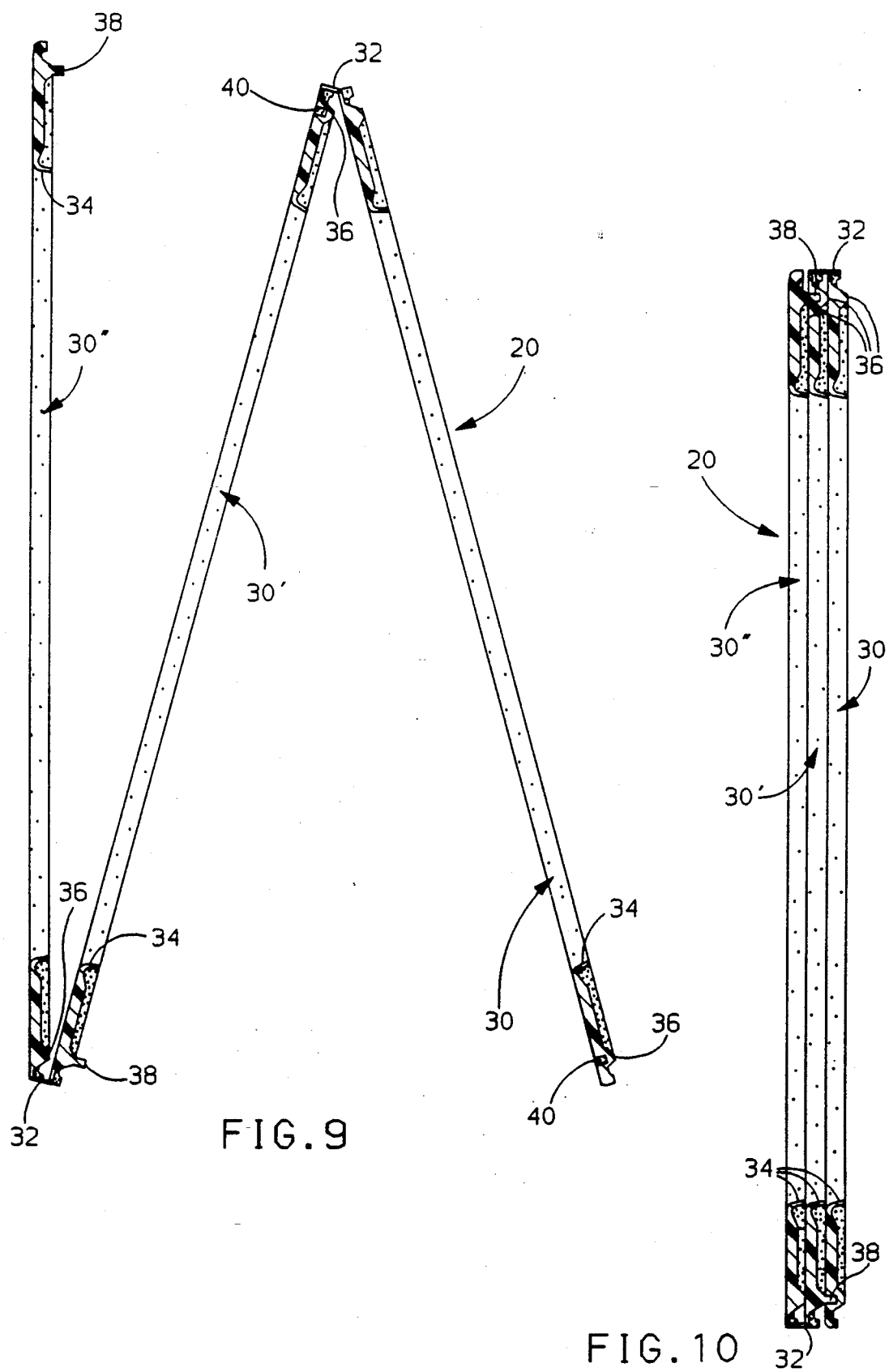
FIG. 9 is a cross sectional side view of the unit in the process of being folded up.
FIG. 10 shows the unit entirely folded up.

Referring first to FIGS. 1, 2 and 10, a preferred embodiment of the seal of the invention is indicated generally at 20. Seal 20 is intended for use with a pair of radially spaced conventional bearing races, an inner race 22 and an outer race indicated generally at 24. Outer race 24 has a trough shaped installation groove 26 machined into its inner surface, bordered by a continuous, chamfered shoulder 28. Groove 26 has a predetermined axial thickness T and is radially spaced from the inner surface of inner race 22 by a predetermined radial width W. Seal 20, in its pre-installation state shown in FIG. 11, has a radial width R that is slightly greater than W, and a total axial thickness T' that is just slightly greater than T. As such, seal 20 is adapted to be installed into groove 26 in the same way that a conventional seal would be, as is described in more detail below. Details of the unit from which seal 20 is built up are described next.

Referring next to FIGS. 3 through 8, seal 20 is initially molded as a unit comprised of three annular rings, which are indicated at 30, 30' and 30" The three rings 30 through 30" are molded together in a coplanar, straight line series, with no radial overlap, by two live hinges 32. Each of the rings 30—30" has the same basic shape and cross section, with a lip 34 forming its inner edge and a thickened circular ridge 36 near its outer edge. The rings 30—30" face in alternating directions, that is, the lip 34 faces one way, then the other, moving from ring to ring in the series. Each ring 30—30" is, in effect, a mirror image of the other relative to the hinge 32. Each hinge 32 has an effective length L, measured between its fold lines, that is approximately equal to the axial thickness t of ridge 36. Each hinge 32 is also sufficiently wide to establish a straight line folding axis between the rings 30—30", labeled X—X in FIG. 4, that is effectively tangent to and coplanar to both of the rings 30—30" that it joins, though it actually touches neither. The two hinges 32 also face in alternate directions. That is, they are designed to fold in opposite directions, as best seen by comparing FIGS. 7 and 8. They are also scored and relieved so that they fold easily in the proper direction, but not in the other direction. The only structural differences among the three rings 30-30" are two pins 38 and matching pin holes 40, which are aligned and lie on the same radius, but which also face in alternating directions.

Still referring to FIGS. 3 through 8, it may be seen how the detailed shape described above allows seal 20 to be manufactured. In general, none of the exterior surfaces of the rings 30—30", nor of the hinges 32, have any undercuts or concavities relative to the central axis of seal 20 before it is folded, that is, relative to a line perpendicular to the plane of the rings 30—30" and running through the center of ring 30'. More particularly, all the surfaces of the pins 38 and the pin holes 40 are either parallel to, or perpendicular to, the central axis. The seal lips 34 do not bend back over on themselves, and do not radially overlap any of the other seal lips 34, as in a conventional multiple lip seal. The hinges 32 also make no radial overlap with the rings 30—30". Consequently, the seal rings 30—30" can be injection molded with only two molds, each of which would have a mold cavity machined to match one side of the three rings 30—30". The molds would part along the central axis freely, without having to snap forcefully past any surface of the molded part left behind. The molding material used can be any plastic material that is flexible enough to provide a good conforming seal lip 34, but stiff enough to be self supporting, with no internal stiffening frame. Some of the newer, more flexible nylon compositions would work well.

Figure 11:
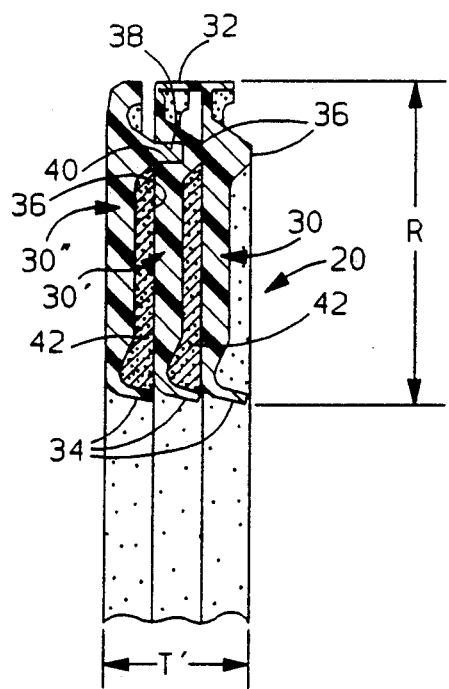
FIG. 11 shows an enlargement of the top portion of FIG. 10, and illustrates how lubricant can be packed between the rings.
Figure 12:
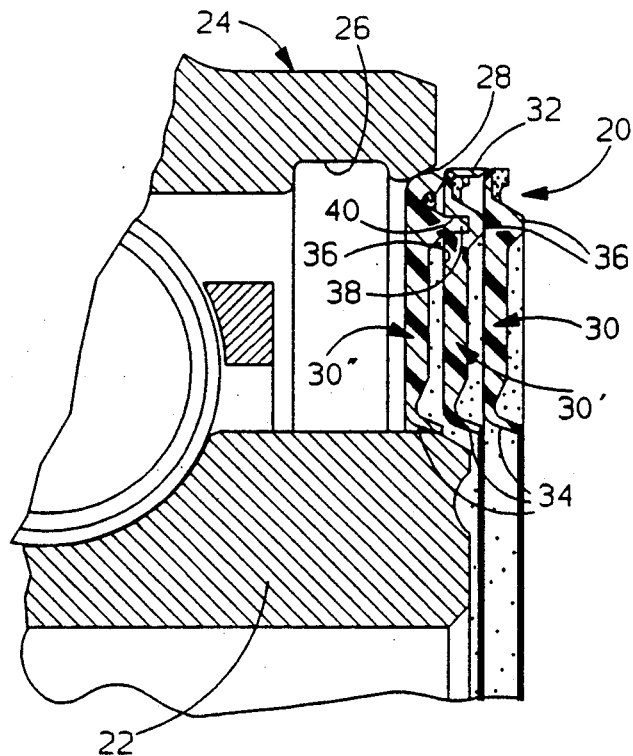
FIG. 12 shows the completed seal at the beginning of installation.

Referring next to FIGS. 9 through 11, the assembly of seal 20 is illustrated. Once released from the mold, the three rings 30—30" are serially folded, one on to the other, until they axially abut one another. Because the rings 30—30" are in a line, they can be folded all at once, accordion fashion. The folding axes X—X described above self orient the rings 30—30", that they fold concentrically. Since the hinges 32 do not readily fold the wrong way, such an error would be readily apparent to the assembler. The length l of the hinges 32 assures that the rings 30—30" fold flat against one another, but they are narrow enough not to stick out appreciably at the corners past the outer diameter of seal 20. Because the pins 38 and alternating slots 40 lie on the same radius and are aligned, they interengage as the rings 30—30" move into concentric abutment, and do so with enough friction to keep them latched together. With self retention, there is no need for a separate metal casing to hold seal 20 together. As shown in FIG. 12, the abutted ridges 36 create cavities between the rings 30—30" which, if desired, can be prefilled with a layer of lubricant 42.

Figure 13:
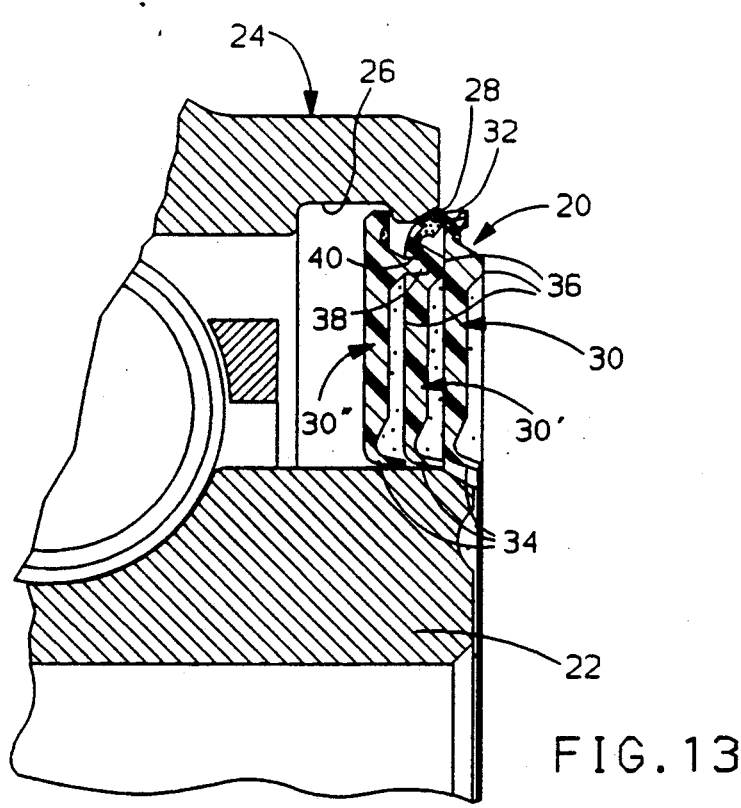
FIG. 13 shows the seal further along in the process of installation.
Figure 14:
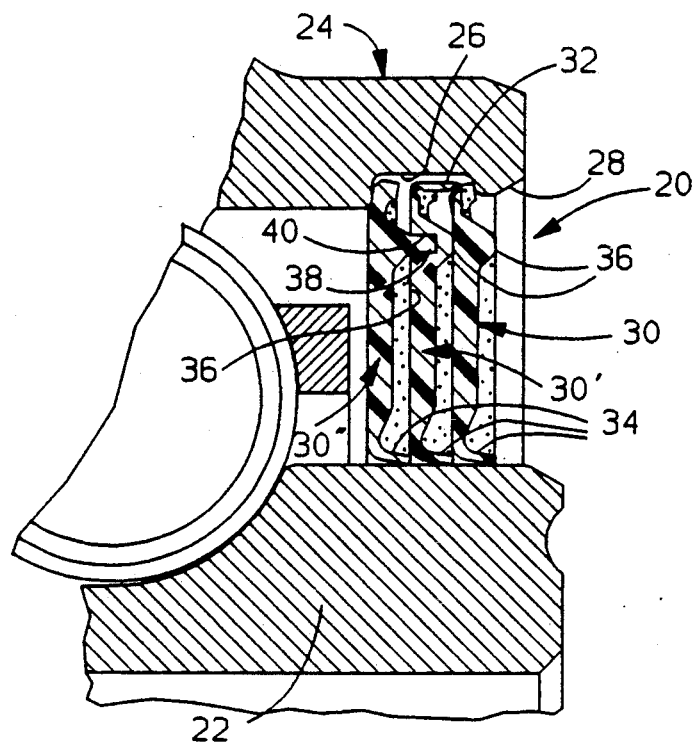
FIG. 14 shows the seal completely installed.

Referring next to FIGS. 12 through 14, the installation of seal 20 is illustrated. Seal 20 is pushed axially between the races 22 and 24, as shown in FIGS. 13. The outer edges of all of the rings 30—30" are progressively bent down by the chamfered shoulder 28, and the flexible hinges 32 do not interfere, as seen in FIG. 13. The outer edges of the rings 30—30" eventually all snap into the installation groove 26, as seen in FIG. 14. The outer edges of the rings 30—30" are clamped in the installation groove 26, under a slight degree of tension because of the relation between T and T'. Consequently, any pins 38 not fully seated in the pin holes 40 will be driven home as the rings 30—30" are pushed together during installation. Because of the relation between R and W, the seal lips 34 are bent in slightly, and also remain under a slight degree of tension.

Figure 15:
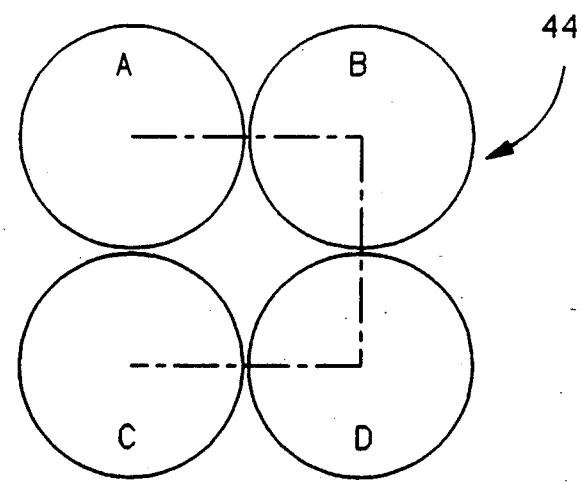
FIG. 15 is a schematic view of an alternate embodiment of the seal of the invention that illustrates the general folding scheme.

Referring to FIG. 15, the general theory of how the elements of seal 20 are joined and folded is illustrated by an alternate embodiment 44, which is shown schematically only. Unit 44 consists of a series of four coplanar rings, indicated simply by the circles A, B, C and D, which would be joined to one another at the points where the dotted line intersects them by hinges just like hinges 32, giving a square pattern. Rings A and D, the first and last in the series, are not joined to one another. While the rings A-D do not lie in a straight line, as with seal 20, they still would face in alternating directions, just like rings 30—30". Since the elements of seal 44 do not lie in a straight line, they cannot be folded together simultaneously. Instead, they would be serially folded, one pair at a time. For example, A would be folded to B, A and B together folded onto C, and A, B and C together folded onto D. The reverse could be done, as well. Or, A could be folded to B and D folded to C, followed by folding A-B and C-D together.

Variations of the embodiments disclosed could be made. Any number of rings could be molded together in the same coplanar series, though their thickness would have to proportionately decrease. Any shape pattern would work, so long as the rings were coplanar, non overlapping, alternately facing, and joined by hinges of the proper width and length to fold the rings flat to each other. A straight line series is most amenable to fast assembly, however, since the rings can be folded all at once. Technically, a latch means to retain the stacked rings together would not be absolutely necessary. The seal could be folded and manually pinched together as it was installed, after which the installation groove 26 would hold it together. A latch means like the pins 38 and holes 40 is particularly advantageous, however, since it is cost free to mold and it engages automatically as the rings are folded together. The latch means is also valuable in maintaining the cavities that would allow the seal to be shipped with a grease fill between the rings. The pins 38 could be tapered, and the pin holes 40 flared, to ease and guide their interengagement, if desired. The ridges 36 could be eliminated in favor of giving the rings 30—30" a constant axial thickness, though this would eliminate the grease retaining cavities, as well. Therefore, it will be understood that it is not intended to limit the invention to just the embodiment disclosed.

The embodiments of the invention in which an exclusive property or privilege is claimed are defined as follows:

1. For use in a bearing having a pair of radially spaced races, one of which has a circular installation groove of predetermined axial thickness, a stacked seal, comprising, a plurality of substantially identical annular seal rings joined together in a coplanar series by alternately facing hinges that establish a folding axis between and tangent to adjacent pairs of rings, said rings also facing in alternating directions relative to said hinges, whereby each ring can be folded serially over into concentric abutment with another to form a stack of rings of the proper size and orientation to be installed to said groove between said races.

2. For use in a bearing having a pair of radially spaced races, one of which has a circular installation groove of predetermined axial thickness, a stacked seal, comprising, a plurality of substantially identical annular seal rings joined together in a coplanar series by alternately facing hinges that establish a folding axis between and tangent to adjacent pairs of rings, said rings also facing in alternating directions relative to said hinges, and, latch means engageable when said adjacent pairs of seal rings are in concentric abutment with one another, whereby each ring can be folded serially over into concentric abutment with another to form a stack of self retained rings of the proper size and orientation to be installed to said groove between said races.

3. For use in a bearing having a pair of radially spaced races, one of which has a circular installation groove of predetermined axial thickness, a stacked seal, comprising, a plurality of substantially identical annular seal rings joined together in a coplanar series by alternately facing hinges that establish a folding axis between and tangent to adjacent pairs of rings, said rings also facing in alternating directions relative to said hinges, and, pins and matching pin holes alternating on said adjacent pairs of rings at the same radius and in alignment with one another, whereby each ring can be folded serially over into concentric abutment with another as said pins enter said pin holes, thereby forming a stack of self retained rings of the proper size and orientation to be installed to said groove between said races.

* * * * *